United States Patent [19]

Ito

[11] Patent Number: 4,968,474
[45] Date of Patent: Nov. 6, 1990

[54] METHOD OF PRODUCING RESIN MOLDED ARTICLE

[75] Inventor: Keizo Ito, Ichinomiya, Japan

[73] Assignee: Toyoda Gosei Co., Ltd., Nishikasugai, Japan

[21] Appl. No.: 399,589

[22] Filed: Aug. 28, 1989

[30] Foreign Application Priority Data

Sep. 19, 1988 [JP] Japan .................. 63-234298

[51] Int. Cl.⁵ .............. B29C 45/16; B29C 49/20; B29D 22/00; B32B 31/00
[52] U.S. Cl. .................................. 264/513; 264/257; 264/266; 264/296; 264/321; 264/324; 264/328.12; 264/516; 264/572
[58] Field of Search ............... 264/257, 259, 266, 294, 264/295, 296, 321, 324, 328.1, 328.12, 339, 510, 512, 513, 516, 572

[56] References Cited

U.S. PATENT DOCUMENTS 4,101,617 7/1978 Friederich ............... 264/572
4,873,045 10/1989 Fujita et al. ............ 264/259

FOREIGN PATENT DOCUMENTS 55-159937 12/1980 Japan ............... 264/516
57-56217 4/1982 Japan ............... 264/513
57-137157 8/1982 Japan .
59-7047 1/1984 Japan .
59-9054 1/1984 Japan .
59-136255 8/1984 Japan .

Primary Examiner—Jeffery Thurlow
Assistant Examiner—Leo B. Tentoni
Attorney, Agent, or Firm—Cushman, Darby and Cushman

[57] ABSTRACT

A method of producing a resin molded article composed of a base material of a synthetic resin and a surface layer provided on the surface of the base material as one body, which includes preparing a mold having a cavity with an end molding portion for molding the end portion of the resin molded article and a body molded portion for molding the body of the resin molded article, the width of the end molding portion being larger than that of the body molding portion. The surface layer is disposed within the cavity of the mold, while disposing molten synthetic resin for the base material on one side of the surface layer so as to be held in the cavity of the mold. The mold is then closed and compressed gas is injected into the molten synthetic resin within the end molding portion so as to expand the molten synthetic resin. Finally, the molten synthetic resin is cured in the cavity. According to the present invention, a method of producing a resin molded article having an excellent outward appearance without warpage or deformation in the end portion of the base material can be provided wherein the step of disposing of the end portion such as bending inward, adhesion, etc., can be eliminated.

13 Claims, 10 Drawing Sheets

FIG. I

METHOD OF PRODUCING RESIN MOLDED ARTICLE

BACKGROUND OF THE INVENTION

1. Field of the Invention

The present invention relates to a method of producing a resin molded article composed of a surface layer and a base material of a synthetic resin formed as one body, wherein joining between the end of the surface layer and the base material is improved.

2. Description of the Related Arts

A resin molded article has been used for automotive trim parts such as an instrument panel (a dashboard), furniture such as a chair, etc., which is composed of a synthetic resin as a base material and a surface layer of a synthetic leather, provided on the surface of the base material.

The abovementioned resin molded article is designated by the numeral 9 in FIGS. 19 and 20. A surface layer 90 composed of a sheet 91 and a foam layer 92 is molded on the surface of a base material 93 which is made of a synthetic resin and has a U-like configuration in cross section as one body. An end portion 901 of the surface layer 90 is bent inwardly and fixed to the back of the base material 93. Tacks, ultrasonic bonding, an adhesive, etc. can be used to fix the end portion. The numeral 94 designates a rib.

The abovementioned resin molded article 9 has been produced by so-called stamping molding as shown in FIGS. 13 through 15. In molding the abovementioned resin molded article, a heated molten synthetic resin 930 is put on a mold surface 811 of a lower mold portion 81 as a base material and the surface layer 90 is disposed thereon. Then, an upper mold portion 82 is lowered on to the lower mold portion so as to press and mold the aforesaid molten synthetic resin 930 and the surface layer 90 (see FIG. 14). Thereafter, a molded article composed of the synthetic resin 93 and the surface layer 90, which are joined as one body, can be obtained by cooling to cure it.

In this molded article, the end portion 901 of the surface layer 90 is bent toward the back of the end portion 931 of the base material 93, and is fixed thereto as described above. Thus, a resin molded article as shown in FIG. 20 is obtained.

However, in the abovementioned conventional method, bent portion A has a large radius of curvature because the surface layer 90 has a foam layer 92. Thus the outward appearance is deteriorated. Further, fixing of the end portion 901 bent inwardly toward the back of the end portion 931 is difficult because of the hard elastic restitution of the foam layer as described above. So, in this bending process, a specific jig for bending is required to fix the end portion 901 to the base material 93 by tacks, an adhesive, etc.

When a burr (or a flash) 93 is formed on the end portion 931 of the base material 93 in molding as shown in FIG. 16, the radius of curvature of the bent portion A is greater.

There is another method as shown in FIG. 17 wherein the surface layer 90 is not bent toward the back of the base material 93. In this case, however, the thickness of the end portion 931 of the base material 93 is very thin, about 2 to 3 mm. So, when the surface layer having elasticity is fixed on such a short distance, the end portion 901 of the surface layer is easily separated from the base material 93.

Then, though it is possible for the thickness of the end portion 931 of the base material 93 to be greater, i.e. 5–6 mm, the synthetic resin of the base material 93 is deformed portion and warpage C occurs as shown in FIG. 18. A sink mark appears in molding and the outward appearance is deteriorated.

As described above, many processes have been necessary to dispose of the end portion 901 of the surface layer 90 in the conventional method of producing a resin molded article having a surface layer. In particular, when the end portion 931 of the base material 93 has a complex convexo-concave shape or a three-dimensional shape, more processes to dispose of the end portion have been required.

SUMMARY OF THE INVENTION

In view of the foregoing problems, it is an object of the present invention to provide a method of producing a resin molded article having an excellent outward appearance without warpage or deformation in the end portion of the base material thereof, wherein the step of disposing of the end portion is eliminated.

According to the present invention, a method for producing a resin molded article composed of a base material of a synthetic resin and a surface layer provided on the surface of the base material as one body is provided. The method comprises preparing a mold having a cavity with an end molding portion for molding the end portion of the resin molded article and a body molding portion for molding the body of the resin molded article, the width of the end molding portion being larger than that of the body molding portion; disposing the surface layer within the cavity of the mold, while disposing molten synthetic resin for the base material on one side of the surface layer to be held in the cavity of the mold; closing the mold; injecting compressed gas into the molten synthetic resin within the end molding portion so as to expand the molten synthetic resin; and curing the molten synthetic resin in the cavity.

DETAILED DESCRIPTION

Figure 1:
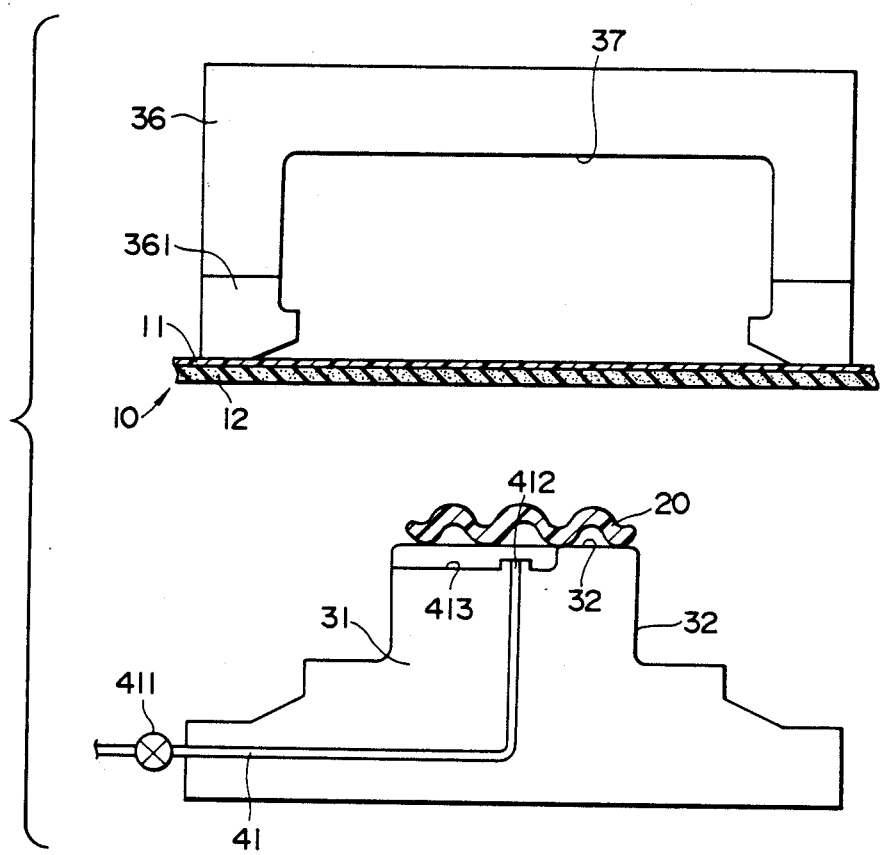
FIGS. 1, 2 and 3 are cross-sectional views taken in the direction of the arrows on line A—A of a mold in FIG. 4 in each step of molding.

In the present invention, it should be noted that a cavity of a mold is made to have a specific shape and that a resin molded article is produced by expanding molten synthetic resin in an end molding portion of the cavity with gas.

In other words, the cavity of the mold comprises an end molding portion for molding an end portion of the resin molded article, and a body molding portion for molding a body portion of the resin molded article other than the aforesaid end portion. The width of the end molding portion is made larger than the width of the body molding portion, and is preferably twice to five times as large as the width of the body molding portion. When it is smaller than the twice the width of that, an end portion of a surface layer may be separated from a base material, while when it exceeds the five times the width of that, the width of the end portion of the base material becomes too large.

In molding, first a surface layer is disposed between an upper mold portion and a lower mold portion, and molten synthetic resin for a base material is disposed on one side of the surface layer. Then closing these mold portions, the molten plastic synthetic resin enters the aforesaid end molding portion. Next, compressed gas such as air, nitrogen, etc. is injected into the molten synthetic resin in the end molding portion. The aforesaid compressed gas expands the molten synthetic resin in the end molding portion like a balloon, so that the surface layer is pressed against the mold surface of one side of the mold and the molten synthetic resin comes in contact with the mold surface of the other side of the mold. Molding in the cavity is thus conducted. Then, after cooling the molten synthetic resin to cure it, a resin molded article is extracted from the mold. The molded article with the hollow end portion is thus formed.

As one molding method, there's the so-called stamping molding, which comprises the steps of injecting molten synthetic resin on the mold surface of one side of the mold, disposing a surface layer thereon, and closing the mold to press, as shown in EXAMPLES 1 and 2. In this method, compressed gas is injected after the press, as described above.

There's another method, the so-called injection stamping molding which comprises the steps of disposing a surface layer between the mold surfaces of the mold, injecting molten synthetic resin into an opening between one side of the surface layer and the mold surface of the mold with the upper and lower mold portions of the mold a little opened, and closing the mold to press, as shown in EXAMPLE 3. In this method, compressed gas is injected after the press as described above.

As the aforesaid synthetic resin, a thermoplastic resin such as polypropylene, acrylonitrile-butadiene-styrene copolymer, etc., is used. The surface layer is composed of a sheet and a foam layer formed as one body. As a material for the sheet, polyvinyl chloride, soft polypropylene, fabric, etc. can be used. As a material for the foam layer, polypropylene foam, slab urethane foam, polyvinyl chloride foam, nonwoven fabric, etc. can be used. As the aforesaid compressed gas, air, nitrogen, etc. having the pressure of 20–100 kg/cm$^2$ can be used.

Figure 2:
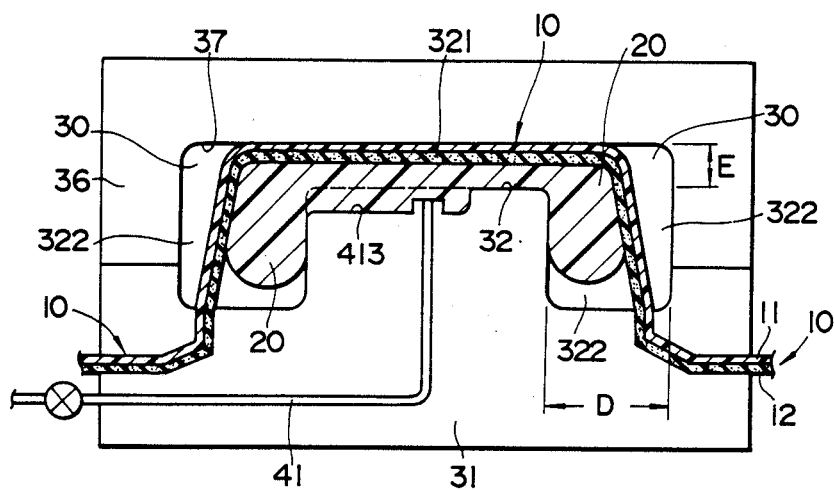
Figure 7:
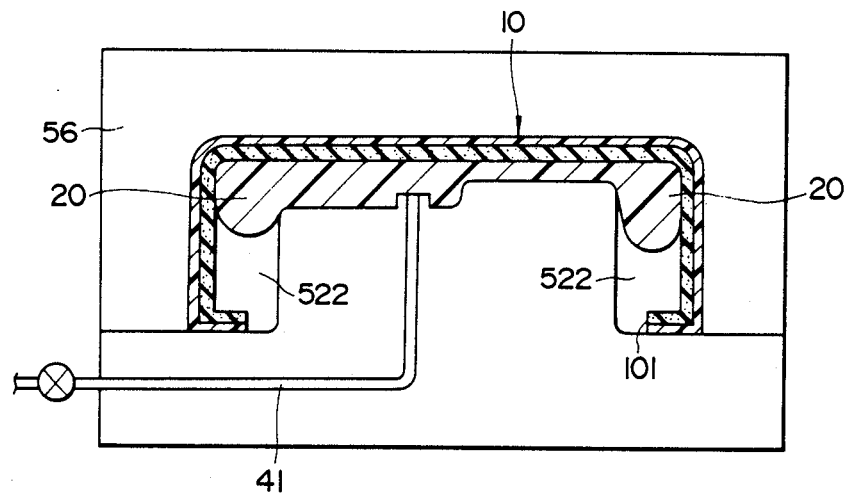
Figure 8:
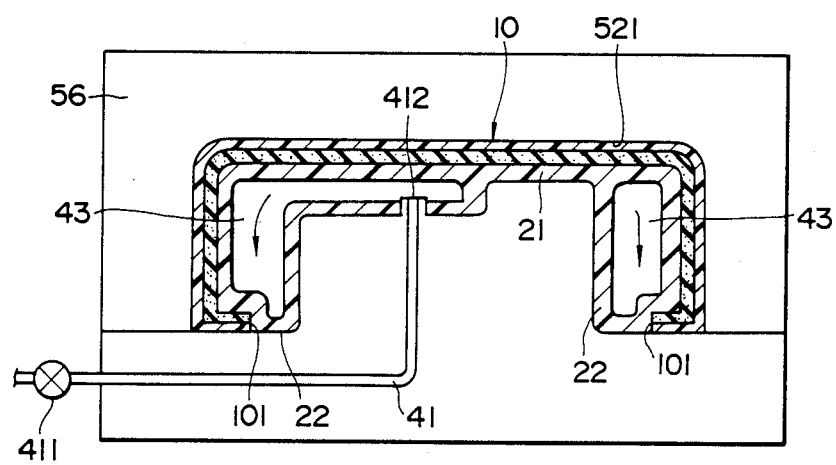
Figure 11:
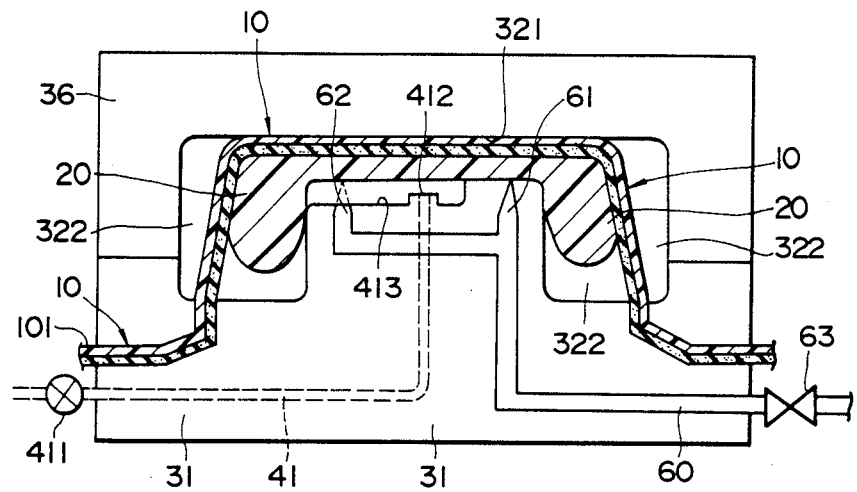

In disposing the surface layer within the mold, the end portion of the surface layer extends to the outside of the cavity as shown in EXAMPLE 1 (FIG. 2), or it is disposed in the cavity in the position near the end portion of the base material as shown in EXAMPLE 2 (FIG. 7). In the former case, the end portion of the surface layer, which protrudes from the molded article, is cut after the molding. In the latter case, the resin molded article, of which the end portion of the surface layer is joined with the base material as one body, can be obtained. Further, the end portions of the surface layer can be disposed so as to extend to the outside of the cavity of the mold from the nearly central part of the under surface of the cavity in the end molding portion (FIGS. 2 and 11). The end portions of the surface layer can also be disposed in the cavity of the mold with the end surface thereof looking toward the inside of the end molding portion (FIG. 7).

In the method according to the present invention, the molten synthetic resin for a base material is disposed on one side of the surface layer disposed in the cavity, and the mold is closed. So, the molten synthetic resin flows into the body molding portion and the end molding portion. Then, compressed gas is injected into the molten synthetic resin in the end molding portion. The molten synthetic resin in the end molding portion expands with forming a cavity inside, so that the surface layer is pressed against the side wall of the cavity and the molten synthetic resin becomes in close contact with the other side wall of the cavity to form the shape of a resin molded article. Thereafter, these are cooled to cure the molten synthetic resin. The resin molded article is thus obtained.

The end portion of the surface layer can be closely contacted with and adhered to the end portion of the base material because the width of the end molding portion in the cavity is formed larger than that of the body molding portion. Therefore, joining of the end portion of the surface layer and the base material is ensured, and separation therebetween as in the conventional art cannot occur. In addition, the end portion of the surface layer is joined to the base material as one body within the mold, the step of disposing of the end portion, i.e. bending it inwardly in the conventional art is not necessary. Joining by a tack, an adhesive, etc. is unnecessary.

There's no sink mark, warpage, and deformation, because the hollow portion thereof is cooled with pressurizing it from the inside by compressed gas. Further, molding is conducted under low pressure because the material in the mold is processed to a final shape by the compressed gas after the press, not in the condition that the mold is completely filled with the material. Therefore, the surface layer of the article can retain the soft feeling.

Accordingly in the present invention, the step of disposing of the end portion of the surface layer such as bending inward, adhesion, etc. can be eliminated and there can be provided a method for producing a resin molded article having an excellent outward appearance without any warpage or deformation on the end portion of the base material.

The present invention will be explained in detail by the following examples.

EXAMPLE 1

Referring to FIGS. 1 through 5, this example will be explained.

Figure 5:
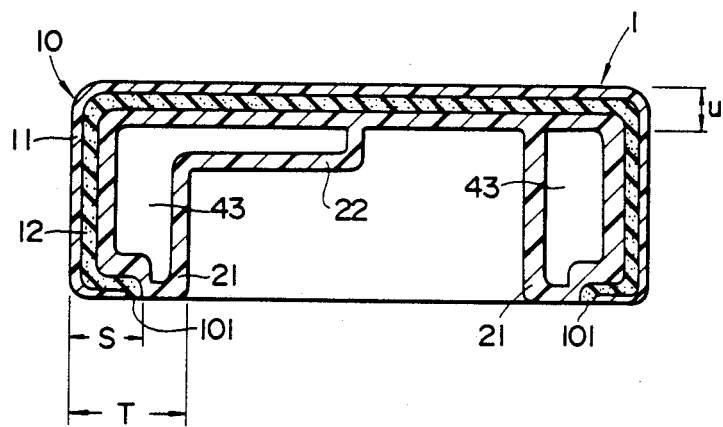
FIG. 5 is a cross-sectional view of a resin molded article.

In this example, the so-called stamping molding method is conducted so as to produce a resin molded article 1 shown in FIG. 5.

First, a mold comprising a lower mold portion 31 and an upper mold portion 36 as shown in FIG. 1 is used. The lower mold portion 31 comprises a mold surface 32 and a gas channel 41. The upper mold portion 36 comprises a sliding core 361 which is provided on the periphery of the upper surface thereof and which can be separated therefrom, and a mold surface 37. When the lower mold portion 31 and the upper mold portion 36 are joined with each other, space is defined between the mold surface 32 and the mold surface 37 so as to form a cavity 30 for molding a resin molded article as shown in FIG. 2. In the cavity 30, the width D of an end molding portion 322 as a side part is about 2.5 times as large as the width E of a body molding portion 321 as an upper part.

At the beginning of molding, molten synthetic resin 20 is disposed on the mold surface 32 of the lower mold portion 31 and a surface layer 10 is positioned thereon as shown in FIG. 1. The surface layer 10 is composed of a sheet 11 and a foam layer 12 which are molded as one body. Next, the upper mold portion 36 is moved downward, and is brought into connection with the lower mold portion 31 to press therebetween, as shown in FIG. 2. In this stage, the molten synthetic resin 20 flows partly toward the end molding portion 322. The end portions of the surface layer extend to the outside of the cavity from the nearly central part of the under surface of the cavity in the end molding portion 322.

Figure 3:
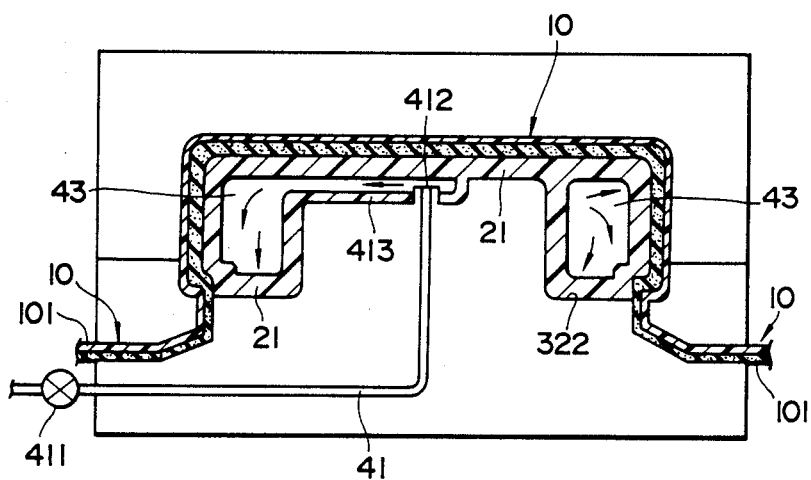
Figure 4:
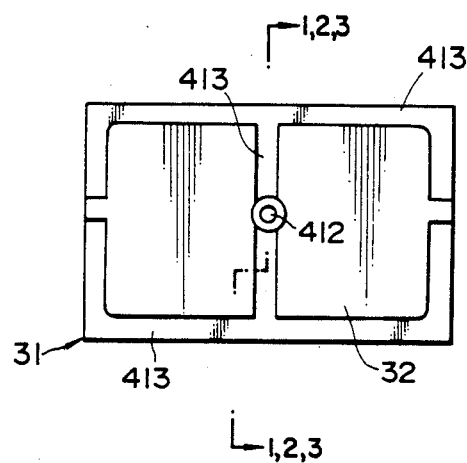
FIG. 4 is a plan view of a mold surface of a lower mold portion.

Then, as shown in FIGS. 3 and 4, a valve 411 is opened so as to introduce compressed gas into the molten synthetic resin 20 within the end molding portion 322 through the gas channel 41 and an air nozzle 412 and through an air channel 413 formed on the mold surface 32 of the lower mold portion. As a result, the molten synthetic resin 20 in the end molding portion 322 expands with a hollow portion 43 spreading so as to press the surface layer 10 against the surface 37 of the upper mold portion, and the resin 20 in itself is brought into contact with the surface 32 of the lower mold portion so as to form a shape of a resin molded article.

Then, the molten synthetic resin 20 thus formed within the cavity 30 is left as it is. When it has been cooled to cure, the joined lower and upper mold portions 31, 36 are separated, and the shaped article molded as one body is removed therefrom. Then, an end portion 101 of the surface layer, which extends downward from the periphery of the article is cut off.

In consequence, the resin molded article 1 of which the surface layer 10 is adhered to the outer periphery of the base material 21 as one body and of which the end portion 101 of the surface layer is fixedly adhered to the end portion of the base material 21 as shown in FIG. 5, can be obtained. Reference numeral 22 designates a rib molded by the air channel 413. The width T of the end portion of the base material 21 is made about 2.5 times as large as the width U of the body portion. In the under surface of the end portion of the molded article, the length S of the surface layer 10 bent inward and adhered to the under surface of the base material 21, is a little smaller than the width T of the base material 21.

According to the present invention, the shaped article removed from the mold as one united body, can be completed to be a resin molded body only by eliminating the end of the surface layer. The step of disposing of the end portion of the surface layer such as bending inward, adhesion, etc., which has been troublesome in the conventional art, is not necessary. In addition, as the end portion of the base material is made larger in width by forming the hollow portion inside, a sink mark, warpage and deformation cannot occur. The resin molded article has an excellent appearance.

As press is conducted in the condition that the resin is not completely filled in the mold, the molding is conducted under the low pressure, so that the foam layer of the surface layer cannot be broken and the surface layer retains the soft feeling.

EXAMPLE 2

Figure 9:
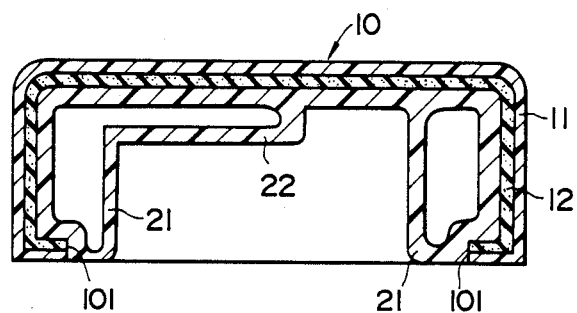
FIG. 9 is a cross-sectional view of a resin molded article.

Referring to FIGS. 6 through 9, this example will be explained. In this example, a resin molded article shown in FIG. 9 is produced.

A mold used in this example comprises a lower mold portion 51 and an upper mold portion 56. The lower mold portion 51 comprises a mold surface 52 and a gas channel 41. The upper mold portion 56 comprises a mold surface 57. The other is same as in EXAMPLE 1.

In producing the aforesaid resin molded article, first a surface layer 10 including the end portion 101 is disposed on the mold surface 57 in the upper mold portion 56.

Figure 6:
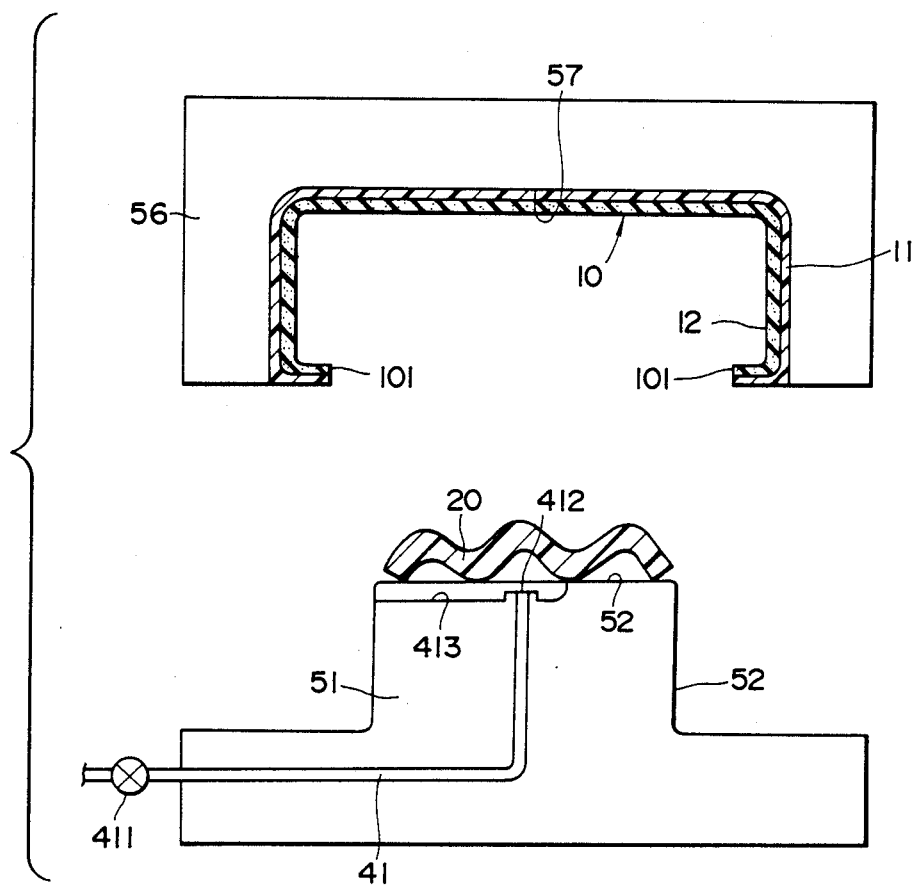
FIGS. 6, 7 and 8 are cross-sectional views of a mold in each step of molding.

Then a plasticized molten synthetic resin 20 is positioned on the mold surface 52 of the lower mold portion in the same manner as in EXAMPLE 1 (see FIG. 6). The upper mold portion 56 is moved downward to press the surface layer 10 against the molten synthetic resin 20 (see FIG. 7). In this stage, the end surface of the surface layer looks toward the inside of the end molding portion. Next, compressed gas is introduced into the molten synthetic resin 20 within an end molding portion 522 through the gas channel 41, etc. so as to expand the molten synthetic resin 20 with a cavity 43 spreading. Reference numeral 521 designates a body molding portion.

Thus, the outer surface of the resin 20 is fixedly adhered to the surface layer 10, and the inner surface is shaped by the mold surface 52 of the lower mold portion 51. After the molten synthetic resin 20 has cooled to cure, a shaped article molded as one body is removed from the mold. The shaped article as it is is made to a resin molded article having a surface layer.

In the molded article thus obtained, the surface layer 10 is joined to the surface of the base material 21 as shown in FIG. 9 in the same manner as in FIG. 5 of EXAMPLE 1. In this example, the end surface of the end portion 101 of the surface layer is in contact with the lower portion of the base material 21, while in EXAMPLE 1, the end surface of the end portion 101 of the surface layer 10 is not joined to the base material 21 and it looks outside in the under surface of the resin molded article (see FIG. 5).

According to the method of this example, the same effect as in EXAMPLE 1 can be obtained and a molded article removed from the mold can be used as a completed resin molded article.

EXAMPLE 3

Figure 10:
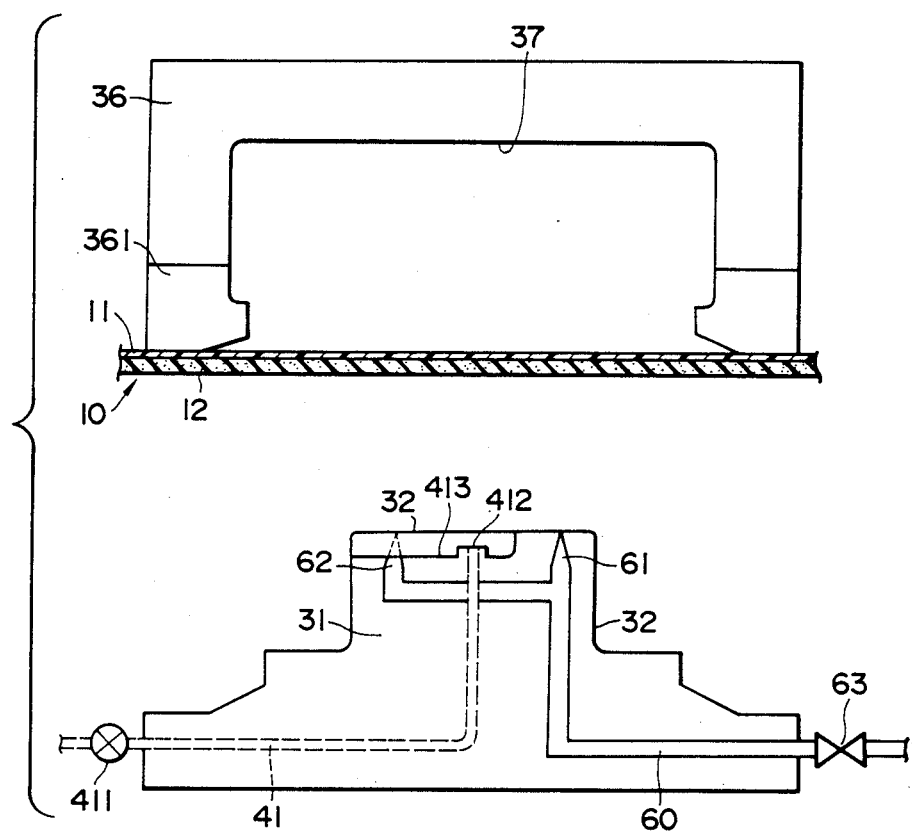
FIGS. 10, 11 and 12 are cross-sectional views of a mold in each step of molding in EXAMPLE 3.
Figure 12:
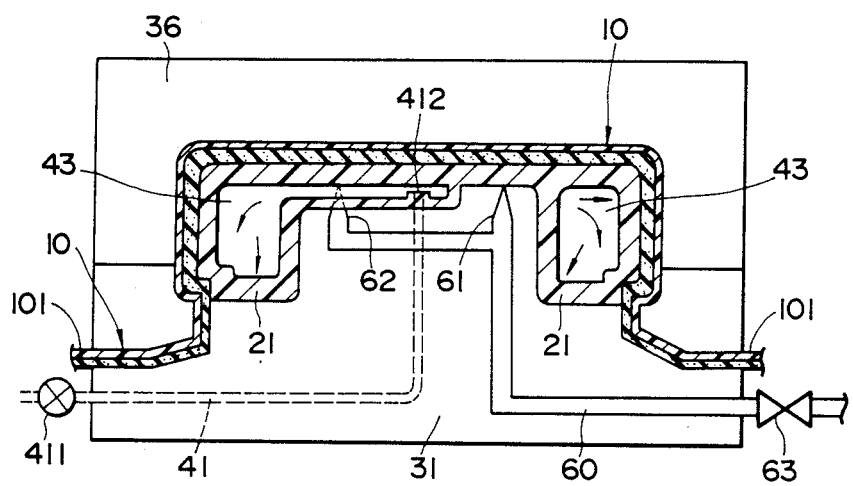
Figure 13:
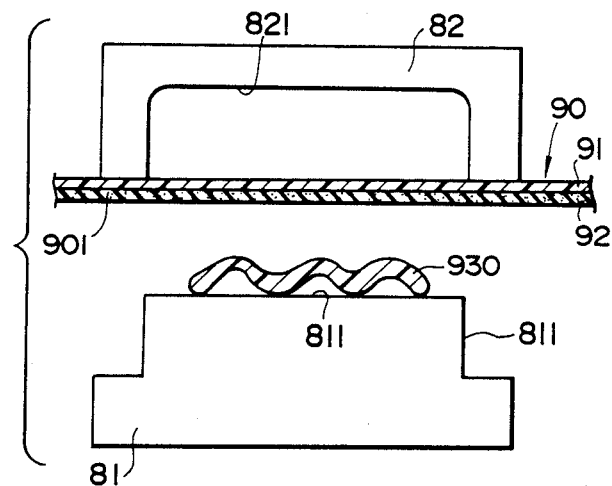
FIGS. 13 and 14 are cross-sectional views of a mold in each step of molding.
Figure 14:
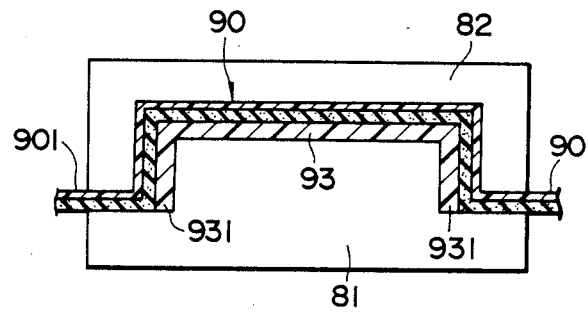
Figure 15:
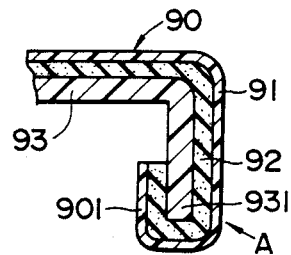
FIGS. 15, 16, 17 and 18 are cross-sectional views showing an end of a resin molded article.
Figure 16:
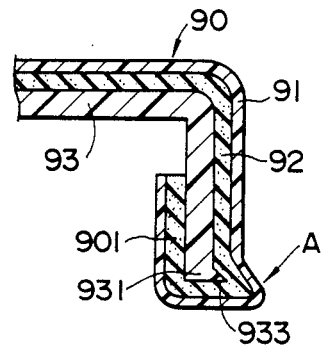
Figure 17:
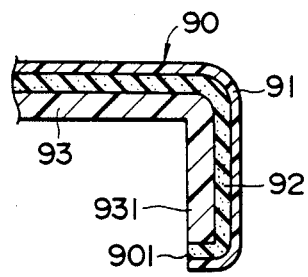
Figure 18:
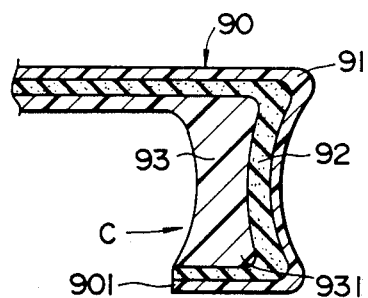
Figure 19:
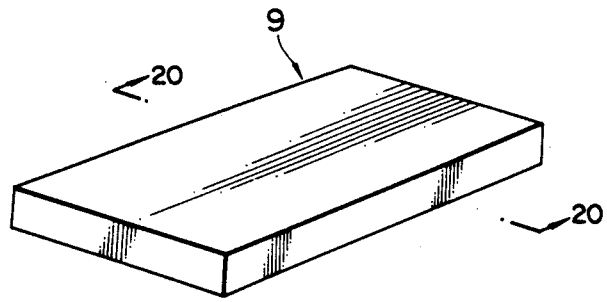
FIG. 19 is a perspective view of the article.
Figure 20:
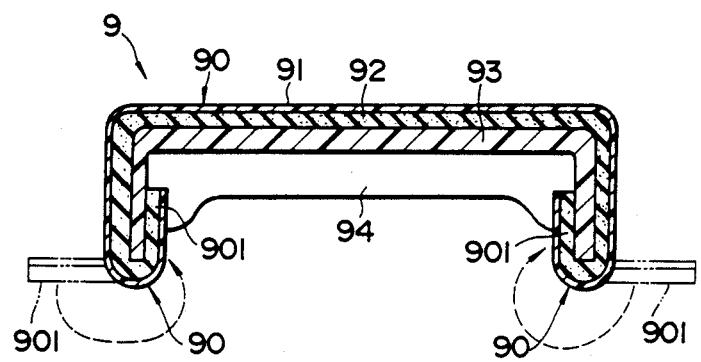
FIG. 20 is a cross-sectional view taken in the direction of the arrows on line X—X of the article shown in FIG. 19.

Referring to FIGS. 10–12, this example will be explained. In this example, the so-called injection stamping molding is conducted so as to obtain the same resin molded article (in FIG. 5) as in the aforesaid EXAMPLE 1.

A mold employed in this example is provided with a hot-runner 60 for introducing molten synthetic resin in a lower mold portion 31. The hot-runner 60 has injection gates 61 and 62 provided on the end thereof and opened to a mold surface 32, and has a valve 63 provided on the other end thereof and connected to an injection machine. The other is same as in EXAMPLE 1.

At the beginning of molding, a surface layer 10 is disposed on the lower mold portion 31 and the lower mold portion 31 and the upper mold portion 36 are partially closed. Next, molten synthetic resin 20 is injected into an opening between the surface layer 10 and the mold surface 32 of the lower mold portion 31 from the hot-runner 60. Then, the upper mold portion 36 is completely put on the lower mold portion so as to close the mold with the surface layer and the molten synthetic resin held therebetween as shown in FIG. 11.

After that, compressed gas is injected into the molten synthetic resin 20 within the end molding portion 322 through the gas channel 41 so as to expand the molten synthetic resin 20 enlarging the hollow portion 43 in the same manner as in EXAMPLE 1. Then the aforesaid resin 20 is cooled to cure it and to obtain a shaped article molded as one body. The shaped article is finished as a resin molded article 1 shown in FIG. 5 by eliminating the end portion 101 of the surface layer 10.

In a article according to this example, the same effect as in EXAMPLE 1 can be obtained. As the injection stamping molding method is employed in this example, the molten synthetic resin can be automatically supplied into the mold and can be supplementarily supplied when the compressed gas being injected.

EXAMPLE 4

A resin molded article was produced in accordance with the method of EXAMPLE 1 under the following conditions.

A plasticized polypropylene heated to 180°–220° C., was used as the molten synthetic resin 20. A joined material composed of a polyvinyl chloride sheet and a polypropylene foam was used as the surface layer 10. The width of the end molding portion was 15 mm. The width of the body molding portion was 4–6 mm. The width of the surface layer was 3–4 mm. Pressure for press between the lower and upper mold portions was 60–100 kg/cm$^2$. Nitrogen gas having a pressure of 30 kg/cm$^2$ was used as the compressed gas to be injected into the molten synthetic resin within the end molding portion. Time to cool and cure the molten synthetic resin after injection of the compressed gas had been finished in molding, was 60 seconds.

Having described out invention as related to the embodiment shown in the accompanying drawing, it is our intention that the invention be not limited by any of the details of description, unless otherwise specified, but rather be construed broadly within its spirit and scope as set out in the accompanying claims.

What is claimed is:

1. A method of producing a resin molded article composed of a base material of a synthetic resin and a surface layer provided on a surface of said base material as one body, comprising:
    preparing a mold having a cavity with an end molding portion for molding an end portion of said resin molded article and a body molding portion for molding a body of said resin molded article, a width of said end molding portion being larger than that of said body molding portion;
    disposing said surface layer within said cavity of said mold, while disposing molten synthetic resin for said base material on one side of said surface layer to be held in said cavity of said mold;
    closing said mold;
    injecting compressed gas into said molten synthetic resin within said end molding portion so as to expand said molten synthetic resin; and
    curing said molten synthetic resin in said cavity.

2. A method according to claim 1, wherein said width of said end molding portion is twice to five times as large as that of said body molding portion.

3. A method according to claim 1, wherein said compressed gas has a pressure of 20–100 kg/cm$^2$.

4. A method according to claim 1, wherein said molten synthetic resin is disposed on a mold surface of one side of said mold, said surface layer is disposed thereon, said mold is closed and then said compressed gas is injected into said molten synthetic resin in the end molding portion.

5. A method according to claim 1, wherein said mold comprises an upper mold portion and a lower mold portion;
    said surface layer is disposed between said upper and lower mold portions and said mold portions are partially closed;
    thereafter said molten synthetic resin is injected into an opening between said one side of said surface layer and a mold surface of said mold;
    said upper and lower mold portions are completely closed; and
    said compressed gas is injected into said molten synthetic resin within said end molding portion.

6. A method according to claim 1, wherein said molten synthetic resin for a base material one of polypropylene and acrylonitrile-butadiene-styrene copolymer.

7. A method according to claim 1, wherein said surface layer is composed of a sheet and a foam layer which are formed as one body.

8. A method according to claim 7, wherein said sheet is one selected from the group consisting of polyvinyl chloride, soft polypropylene, and fabric.

9. A method according to claim 7, wherein said foam layer is one selected from the group consisting of polypropylene foam, slab urethane foam, and polyvinyl chloride foam.

10. A method according to claim 1, wherein end portions of said surface layer extend to an outside of said cavity of said mold.

11. A method according to claim 1, wherein end portions of said surface layer are disposed in said cavity of said mold.

12. A method according to claim 10, wherein end portions of said surface layer extend to an outside of said cavity of said mold from a nearly central part of an under surface of said cavity in said end molding portion.

13. A method according to claim 11, wherein end portions of said surface layer are disposed in said cavity of said mold with an end surface thereof looking toward an inside of said end molding portion.

* * * * *